United States Patent [19]

Dunn et al.

[11] Patent Number: 4,547,080

[45] Date of Patent: Oct. 15, 1985

[54] CONVECTIVE HEAT FLOW PROBE

[75] Inventors: James C. Dunn; Harry C. Hardee; Richard P. Striker, all of Albuquerque, N. Mex.

[73] Assignee: The United States of America as represented by the United States Department of Energy, Washington, D.C.

[21] Appl. No.: 569,086

[22] Filed: Jan. 9, 1984

[51] Int. Cl.$^4$ ............................................. G01K 1/16
[52] U.S. Cl. .................................... 374/135; 374/136
[58] Field of Search ............... 374/113, 134, 135, 136; 73/154, 155; 166/139, 206, 207, 179, 124; 175/4.52

[56] References Cited

U.S. PATENT DOCUMENTS

| | | | |
|---|---|---|---|
| 1,796,547 | 3/1931 | Trout | 73/155 |
| 2,524,150 | 10/1950 | Vincent | 374/136 |
| 2,580,182 | 12/1951 | Morgan et al. | 73/155 |
| 2,646,680 | 7/1953 | Steele et al. | 374/136 |
| 2,675,702 | 4/1954 | Buck | 73/155 |
| 2,851,108 | 9/1958 | Reed | 166/139 |
| 2,906,347 | 9/1959 | Baker | 166/139 |
| 3,171,491 | 3/1965 | States | 166/124 |
| 3,745,822 | 7/1973 | Pierce et al. | 73/154 |
| 3,808,889 | 5/1974 | Rawson et al. | 374/136 |
| 3,874,232 | 4/1975 | Hardison | 73/154 |
| 3,892,128 | 7/1975 | Smith, Jr. | 73/154 |
| 4,109,717 | 8/1978 | Cooke, Jr. | 73/154 |

OTHER PUBLICATIONS

Reiter et al., Measurement of the Horizontal Component of Ground Water Flow using a Vertically Positioned In-Situ Thermal Probe, WRRI Report, No. 055, May 1975, New Mexico Water Resources Research Institute.

Measurement of Groundwater Flow using an In-Situ Thermal Probe, WRRI Report, No.-027, by Dunn, Jul. 1973, New Mexico Water Resources Research Institute, by Reiten et al.

Boundary Layer Solutions for Natural Convection in Porous Media, May 1976, by Hardee Sandia Laboratories.

Permeable Convection Above Magma Bodies, by Hardee, Jun. 1981, Geothermal Research Diuision Sandia National Laboratories.

Primary Examiner—Charles Frankfort
Assistant Examiner—David R. Schuster
Attorney, Agent, or Firm—George H. Libman; Albert Sopp; Judson R. Hightower

[57] ABSTRACT

A convective heat flow probe device is provided which measures heat flow and fluid flow magnitude in the formation surrounding a borehole. The probe comprises an elongate housing adapted to be lowered down into the borehole; a plurality of heaters extending along the probe for heating the formation surrounding the borehole; a plurality of temperature sensors arranged around the periphery of the probe for measuring the temperature of the surrounding formation after heating thereof by the heater elements. The temperature sensors and heater elements are mounted in a plurality of separate heater pads which are supported by the housing and which are adapted to be radially expanded into firm engagement with the walls of the borehole. The heat supplied by the heater elements and the temperatures measured by the temperature sensors are monitored and used in providing the desired measurements. The outer peripheral surfaces of the heater pads are configured as segments of a cylinder and form a full cylinder when taken together. A plurality of temperature sensors are located on each pad so as to extend along the length and across the width thereof, with a heating element being located in each pad beneath the temperature sensors. An expansion mechanism driven by a clamping motor provides expansion and retraction of the heater pads and expandable packer-type seals are provided along the probe above and below the heater pads.

11 Claims, 3 Drawing Figures

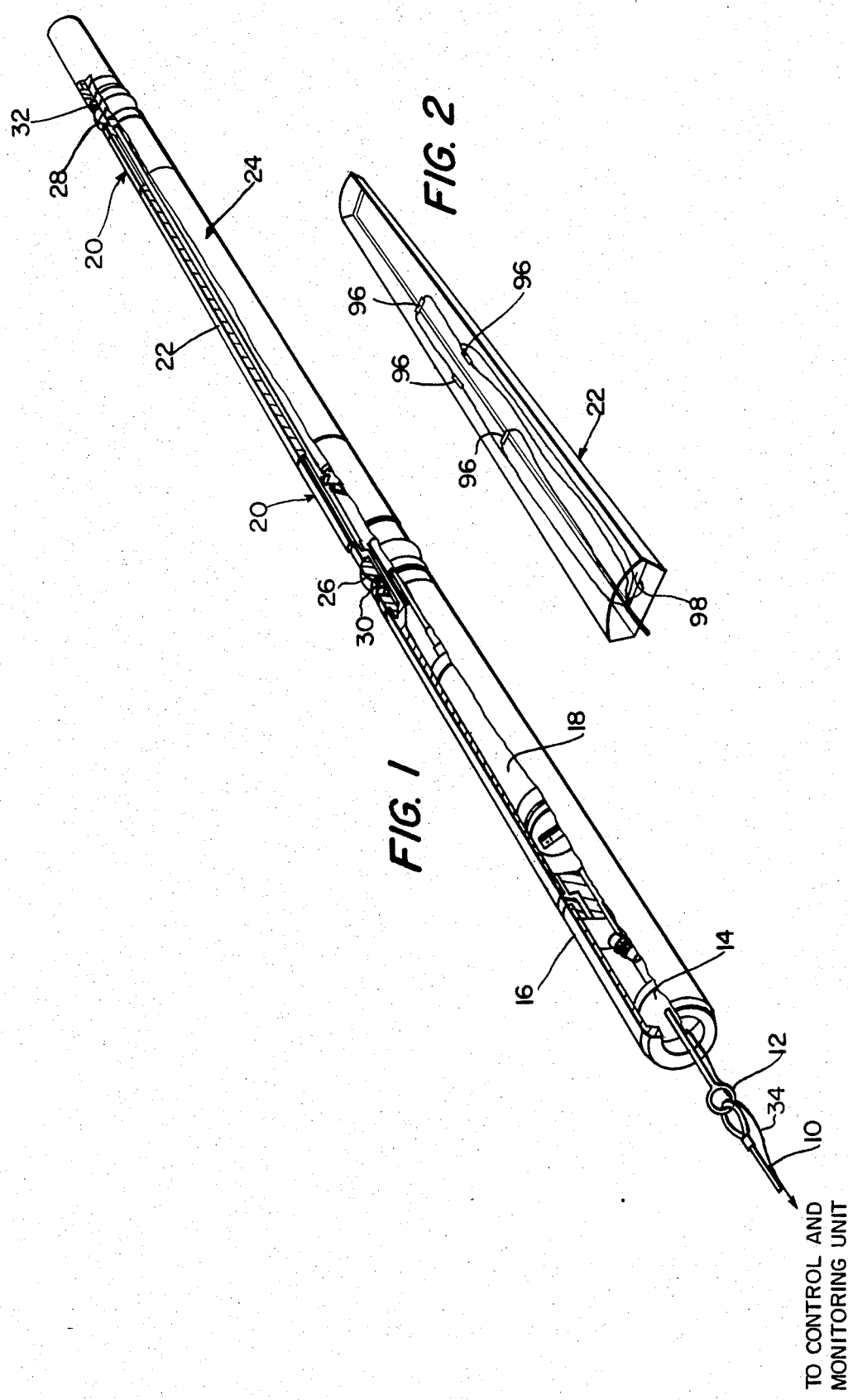

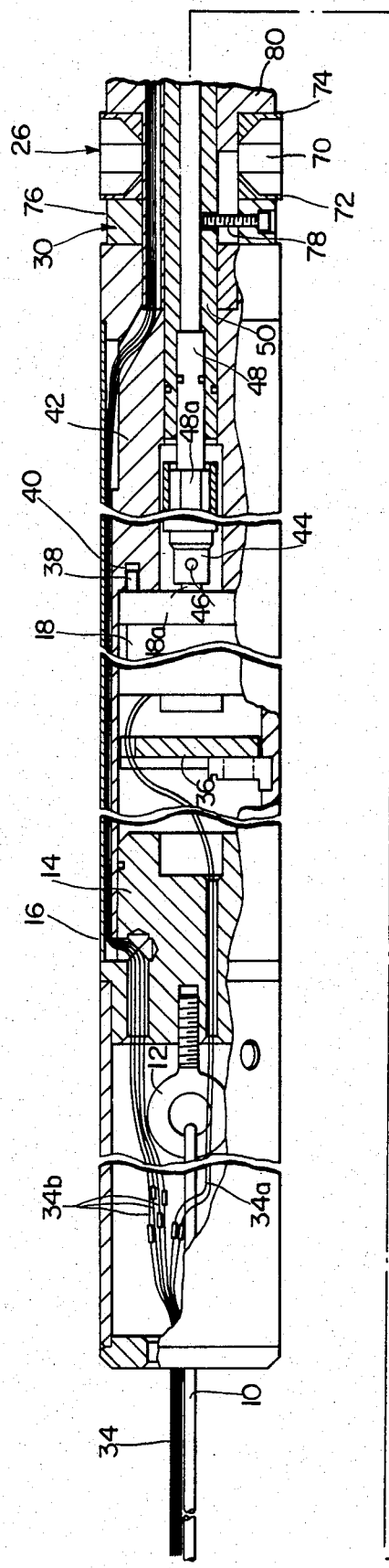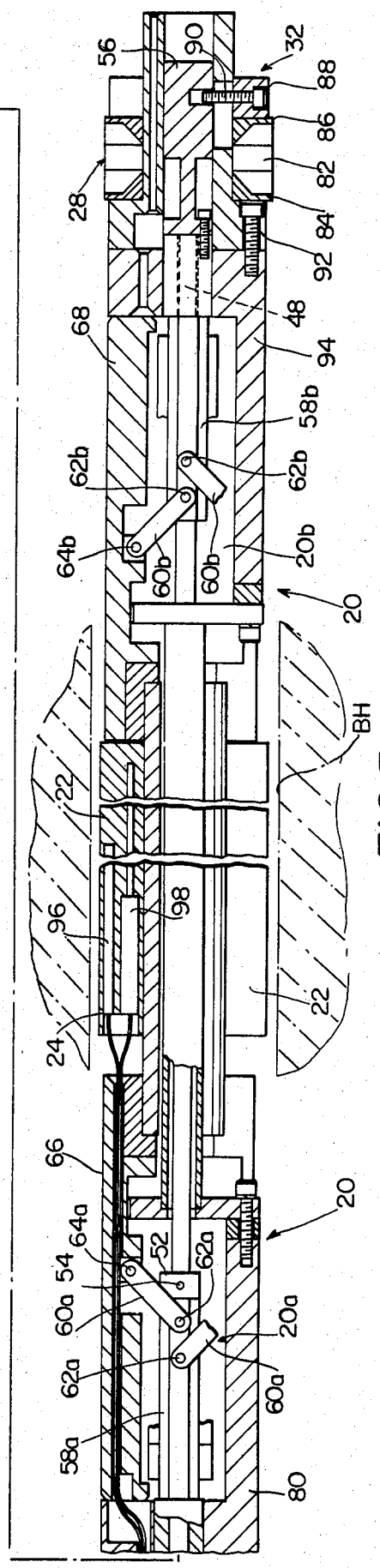
FIG. 3

CONVECTIVE HEAT FLOW PROBE

The United States Government has rights to this invention pursuant to Contract No. DE-AC04-76DP00789 between the U.S. Department of Energy and AT&T Technologies, Inc.

FIELD OF THE INVENTION

The present invention relates to a convective heat flow probe for measuring heat flow and fluid flow magnitude and direction in the geologic formation surrounding a borehole.

BACKGROUND OF THE INVENTION

The measurements referred to above, i.e., measurements of heat flow and fluid flow magnitude and direction in the formation surrounding a borehole provide information that has a direct bearing on the location and assessment of geothermal resources as well as oil resources, both having a particular thermal or heat flow signature. A need exists for an instrument that will produce such measurements in a relatively rapid, efficient and reliable manner, while providing very high accuracy.

Thermal probes used in the measurement of the ground water flow rate are discussed in Reiter et al, "Measurement of Groundwater Flow using an In-Situ Thermal Probe", New Mexico Water Resources Research Report, WRRIReport 027, Project No. A-042-NMEX, July 1973, and in McLin et al, "Measurement of the Horizontal Component of Ground Water Flow Using a Vertically Positioned In-Situ Thermal Probe", New Mexico Water Resources Research Institute, WRRIReport 055, Project No. A-044-NMEX, May 1975. The thermal probes employed generally comprise an elongate slender metal rod having a heat source along the entire length thereof and a temperature sensor at the midpoint thereof. When a constant quantity of heat is applied to the probe, the rise in temperature caused by the probe is directly related to the rate of water flow past the probe.

Other prior art devices of possible interest include those disclosed in U.S. Pat. Nos. 2,675,702 (Buck); 1,796,547 (Trout); 2,524,150 (Vincent); 2,580,182 (Morgan); 3,808,889 (Rawson); 3,745,822 (Pierce); and 4,109,717 (Cooke). The Buck, Trout, Vincent and Morgan patents are concerned with measuring fluid flow in a producing or test well which, as will appear, is physically a totally different measurement than that provided by the invention. The Pierce patent is concerned with measuring circumferential direction to a heat source but not one in a permeable convection formation. The Cooke patent is concerned with measuring the orientation of fractures around a borehole in response to hydraulic fracturing. The measurement provided, and the purpose thereof, are totally different from that of the present invention. The Rawson patent is relevant to the present invention in that heat flow measurements are made at a local position downhole. However, the Rawson device is adapted for use with conductive or "dry" formations rather than convecting or "wet" permeable formations and cannot be used with the latter because there is little natural thermal gradient to be measured and any fluid in the borehole will short out the brushes of the Rawson device.

SUMMARY OF THE INVENTION

In accordance with the invention, a downhole convective heat probe is provided which is based on a thermal pertubation principle and which is particularly adapted to measure heat flow in regions where convective transport of heat is important. Because heat flow measurements in these regions require a determination of the water velocity vector, the probe is also designed to measure the local ground water velocity vector. In general, in a convecting environment, surface temperatures on the probe are perturbed from the values which would obtain in a purely conductive environment, and these temperatures can be theoretically related to the local velocity vector. The resolution provided by the probe of the invention is much greater than that available with the probes developed at the New Mexico Water Resources Institute and described in the references referred to above. An important factor in this improved resolution concerns the fact that the probe of the invention enables detecting of asymmetric temperatures along the probe that represent perturbations from temperatures obtained in a conductive environment, with the conductive solution being, in effect, subtracted out.

In accordance with a preferred embodiment of the invention, a convective heat flow probe device is provided which basically comprises: an elongate housing including means for enabling the housing to be lowered down into a borehole; heater means extending along the probe for heating the formation surrounding the borehole; temperature sensor means, comprising a plurality of temperature sensors arranged around the periphery of the probe, for measuring the temperature of the surrounding formation after heating thereof by the heater means; and means for monitoring the heat supplied by the heater means and the temperatures measured by the temperature sensors. The temperature sensors are mounted on at least two separate units supported by the housing and the probe device further comprises control means for providing radial expansion of the units so as to bring the units into firm engagement with the walls of the borehole. These units each preferably comprise a heater pad, and the heating means comprises a heating element incorporated in each heater pad along with at least one temperature sensor. Advantageously the outer peripheral surfaces of the heater pads are configured as segments of a cylinder and thus when taken together, form a full cylinder. A plurality of said temperature sensors are preferably located in each pad so as to extend along the length and across the width thereof, with the associated heating element being located in the pad beneath the temperature sensors.

The control means for providing radial expansion of the heater pads preferably comprises a control motor and an expansion mechanism controlled thereby. Advantageously, the expansion mechanism comprises a lead screw driven by the control motor and a support collar mounted on the lead screw for movement in response to rotation of the lead screw and at least one pivotable attachment arm connected between said support collar and an associated heater pad unit, so as to be pivotable, in response to movement of the support collar, to an expanded position wherein the associated unit is expanded radially. Preferably, a support collar is mounted at each end of the heater pad units, the support collars being mounted on the lead screw so as to move toward each other in response to rotation of the lead screw so as to provide radial expansion of heater pad units.

In accordance with a further aspect of the invention, a means is provided for producing a seal between the probe and the walls of the borehole. Preferably, this seal providing means comprises a resilient packer member and actuator means movable responsive to rotation of the lead screw for compressing the packer member to provide radial expansion thereof. Advantageously, such a seal providing means is located at both ends of the heater pad units.

Other features and advantages of the invention will be set forth in, or apparent from, the detailed decription of a preferred embodiment which follows.

BRIEF DESCRIPTION OF THE DRAWINGS

FIG. 1 is a perspective view of the convective heat flow probe of the invention;

FIG. 2 is a perspective view of one of the heater pads of the probe of FIG. 1; and FIG. 3 is a longitudinal cross sectional view to an enlarged scale of the probe of FIG. 1.

DESCRIPTION OF THE PREFERRED EMBODIMENTS

Referring to FIG. 1, the basic components of the convective heat flow probe of the invention are illustrated. These components are shown in more detail in FIG. 3 and reference will be made to FIG. 1 to identify the major components and their relationship so as to provide an overview of the heat flow probe of the invention. Thus, as shown in FIG. 1, the probe includes a support cable 10 which is attached to eyebolt 12 and is used in lowering the probe into a borehole. The eyebolt 12 is screwed into a mounting member 14 which is supported within an elongate cylindrical housing 16. A clamp motor 18 is also mounted within housing 16. Motor 18 provides actuation of an expansion mechanism generally denoted 20 and described in more detail below. Expansion mechanism provides expansion of a plurality of heater pads 22 of corresponding heater pad assemblies 24 against the walls of the borehole. One of the heater pads 22 is shown in FIG. 2 and these heater pads are described in more detail hereinafter. A pair of isolation packers 26 and 28 and associated packer actuators 30 and 32 are located on opposite ends of the heater pad assemblies 24 and used in sealing off the borehole at a point above and a point below the heater pad assemblies 24. A bundle of control and instrumentation wires 34 provides electrical connections between the probe and a control and monitoring unit (not shown) whose function is described below.

Reference is now made to FIG. 3, which shows the constructional details of the convective heat flow probe of the invention. As mentioned above and illustrated in more detail in FIG. 3, a plurality of control and instrumention wires, generally denoted 34, extend along support cable 10 into housing 16 and through support member 14 and other components mounted within housing 16. Two of these wires, denoted 34a, are connected to clamp motor 18, while the remainder, denoted 34b, are connected to components of the heater pad assembly 24 as described below. When the probe is lowered to a predetermined depth, a d.c. electrical current is applied through control wires 34a to d.c. clamp motor 18 to energize the motor.

Motor 18 is secured to main housing 16 by a motor bracket assembly 36 located at one end thereof and by four shear pins 38 (only one of which is shown) at the other end thereof. Shear pins are received in corresponding holes 40 in a mounting member 42 affixed to the distal end of the main housing 16.

The ouput shaft 18a of motor 18 is connected to a deep well socket 44 and secured by a shear pin 46. The proximal end of a lead screw 48 has a hexagonal head 48a which rests inside of deep well socket 44. The lead screw 48 is positioned within support member 42 by an alignment collar 50 and is held captive but allowed to rotate by a stop collar 52 and associated pin 54. An alignment extension 56 is threaded onto lead screw at the far distal end thereof.

Expansion mechanism 20 includes two similar parts 20a and 20b respectively located upstream and downstream of heater pad assembly 24. Portion 20a includes an alignment collar 58a threaded onto lead screw 48 and four attachment arms 60a (two of which are shown) which are pinned by pins 62a to alignment collar 58a. The other ends of attachment arms 60a are connected by pins 64a to one end of the heater pad assembly 24. The second part, 20b, of expansion mechanism 20 similarly includes an alignment collar 58b which is threaded onto lead screw 48 and to which are connected, by pins 62b, four attachment arms 60b. Attachment arms 60b are attached by pins 64b to the other end of the corresponding heater pad assembly 24. As discussed below, four such assemblies are provided in spaced relation about the circumference of the probe.

Each heater pad assembly includes a pair of support members 66 and 68 at the opposite ends thereof to which the attachment arms 60a and 60b are attached. A corresponding heater pad 22 is located between and secured to support members 66 and 68 so as to be movable therewith. The heater pads 22 themselves will be described below.

Outward movement of heater pad assemblies 24 into a position in engagement with the walls of the borehole BH (indicated in dashed lines) is controlled by motor 18 by virtue of the drive mechanism just described. More specifically, as output shaft 18a of motor 18 rotates, the lead screw 48 rotates and the hexagonal head 48a of lead screw 48 moves forward (to the left as viewed in FIG. 1) in deep well socket 44. Alignment collars 58a and 58b of the expansion mechanism 20 are threaded onto lead screw 48 as to be drawn towards one another responsive to the rotation of lead screw 48. Consequently, attachment arms 60a and 60b are caused to pivot so as to drive the corresponding heater pad assembly 24 radially outwardly against the borehole wall, eventually locking the pads 22 against this wall. As the pads 22 begin to lock tightly against the borehole wall, the current demands of motor 18 increase. The current is monitored at the surface and this increase is detected and used to determine when to de-energize motor 18. Motor 18 is de-energized when the heater pads are properly locked against, i.e., are in very tight engagement with, the borehole wall.

Isolator packer 26 comprises an annular flexible rubber packer member 70 located between a pair of restraining washers 72 and 74. The packer actuator 30 for packer 26 comprises a collar member 76 which is keyed by a screw 78 to alignment collar 50 so as to move therewith. Alignment collar 50 is threaded onto lead screw 48 so as to move in the direction of the distal end of the probe (i.e., towards the right as viewed in FIG. 3) in response to rotation of the lead screw. The packer 26 is located between collar member 76 and a structural support member 80 of the probe and thus, when lead screw 48 rotates collar 76 forces packer member 70 against support member 80 and causes compression thereof, thereby squeezing the packer member 70 radially outwardly against the borehole wall and consequently providing a seal.

Similarly, packer 28 comprises a rubber packer member 82 held between a pair of retaining washers 84 and 86 and actuator 32 comprises a collar member 88 connected by screw 90 to alignment extension 56. Packer member 84 is positioned between collar 88 and an end member 92 bolted to a structural member 94 of the probe. Alignment extension 56 is threaded onto lead screw 48 so as to move in a direction away from the distal end of the probe, i.e., to the left as viewed in FIG. 3, in response to rotation of the lead screw and thus collar 88 will compress packer member 84 against member 92 and thereby cause the packer member 84 to be squeezed radially so as to provide a seal in the manner described above.

The heater pad assemblies 24 each basically comprise a segmented strip, made up of a pad 22 and support members 66 and 68, which occupies approximately 95 percent of the circumference of the probe so that the four assemblies 24, taken together, form a full circular shell. The pads 22 each contain temperature sensors 96 and a heater element 98 (see also FIG. 2) which are connected by wires 34b to instrumentation at the surface. The sensors 96 are arranged in a predetermined pattern near the surface of the pad 22 with sensors 96 extending both across and along the pad as shown in FIG. 2, while heater pad 98 is positioned therebeneath.

Considering the operation of the convective heat flow probe of the invention, the initial operating steps should be evident from the foregoing description. Briefly reviewing these steps, the probe is lowered into the borehole by cable 10 and when the appropriate depth is reached, clamping motor 18 is energized through wires 34a to provide rotation of lead screw 48 and consequent actuation of the expansion mechanism 20 to expand pads 22 against the borehole wall as well as compression of packers 26 and 28 to provide seals along the borehole at points above and below pads 22.

With the pads 22 firmly locked and the packers 26,28 sealed against the walls of the borehole, motor 18 is de-energized and the testing operations are begun. In particular, an electrical current is supplied to heater elements 98 of heater pads 22 in accordance with a predetermined heating program or pattern. Energization of the heater elements 98 of the pads 22 cause heating up of the borehole wall and the surrounding geologic formation and formation fluids. This, in turn, alters the normal convective transport in the adjacent geologic formation in a predictable manner. The temperature sensors 96 measure this alteration or perturbation at the borehole wall. This temperature information is transmitted to the surface by instrumentation wires 34b.

At the surface, the electrical response of the sensors is monitored along with the amount of electrical power supplied to the heater elements 98 of pads 22 and this information is stored on magnetic tape by a computer controlled acquisition system. The data is later processed and compared with analytical and numerical solutions for convective transport in a permeable medium. From this analysis, the final result is a determination of the undisturbed fluid velocity vector (both magnitude and vector direction) in the geologic medium surrounding the borehole at the depth where the probe is operated. At this position, the rate of convective heat transport, denoted e, across a unit area of arbitrary orientation is given by the equation: $e = \rho h \overline{V} \cdot n$, where $\rho$ and h are fluid density and enthalpy, respectively, n is the unit normal vector of the arbitrary surface, and $\overline{V}$ is the fluid velocity vector. The fluid density and enthaly can be determined from the local pressure and temperature. Since the fluid velocity vector is determined from measurements using the probe of the invention as described above, this velocity vector can be substituted in the equation to determine the local value of the convective energy transport in any direction.

After a sufficient number of measurements at the various heater power levels (and frequently, a single measurement can be sufficient), the probe is removed from the borehole or moved to a depth within the same borehole. This is accomplished by supplying a reverse d.c. electric current to the d.c. clamp motor 18 to cause rotation of output shaft 18a, and thus lead screw 48, in the opposite direction. This, in turn, causes both the heater pad assemblies 24 and the packers 26 and 28 to be retracted inwardly from the borehole wall.

Turning now to specific simplified examples of the use of the probe of the invention, consideration will be given an example wherein the natural circulation of ground water in the fractured or porous geologic formation is vertically downward (i.e., a "downwelling" zone). As before, the probe is inserted in a borehole in the formation and the heater elements 98 of pads 22 are turned on. Formation water in the adjacent formation is heated as a result and becomes relatively buoyant and thus has a tendency to rise in opposition to the normal downward movement of formation water in this "downwelling" zone. If the heater power is slowly increased, a point will be reached where the vertical upward buoyant forces of the heated water and the natural downward hydrological forces in the downwelling zone exactly cancel out in the vicinity of the borehole. Formation water movement near the probe then stops and the fluid is locally stagnant. Since there is now no local movement of formation water, the heat carried away by the formation is minimal and the temperature sensors 96 in the heater pads 22 indicate a maximum value. It is thus possible to find this point by slowly increasing the heater power until a maximum reading occurs for the temperature sensors 96 of the pads 22. The temperature maximum identifies the formation as a "downwelling" zone and the amount of electrical power to the heaters at the temperature maximum can be mathematically related to the magnitude of "downwelling" flow.

Consider now an example wherein there is a flow of hydrologic water moving horizontally through the geologic formation. Again, probe is locked into the borehole and the heater elements 98 of heater pads 22 are turned on. As noted above, the temperature sensors 96 in the pad 22 on the upstream side will respond differently than those on the downstream pad because the upstream pad is better cooled by the formation water flow. The downstream pad is cooled less efficiently because the formation water has been partially heated by the other heater pads 22 before the water reaches the downstream pad. It is thus possible in this case to determine the azimuthal vector direction of the hydrologic water movement by observing which pad is hottest and which is coolest. A standard commercial magnetic orientation device (not shown) is attached to the convective heat flow probe and is used to orient the convective heat flow probe with respect to magnetic north. The hydrologic water flow vector can then be identified relative to magnetic north. Further, the amount of temperature difference between the upstream and downstream pads is related to the volume flow of formation water and its net convective transport rate. Both magnitude and direction of natural underground water flow and convective heat transport by the water can then be obtained.

Although the invention has been described with regard to exemplary embodiments thereof, it will be understood by those skilled in the art that variations and modifications can be effected in this exemplary embodiment without departing from the scope and spirit of the invention.

We claim:

1. A convective heat flow probe comprising:
   an elongate housing including means for enabling the housing to be lowered down into a borehole;
   heater means extending along the probe for heating the formation surrounding the borehole, said means comprising a heating element and at least one temperature sensor;
   at least two separate units supported by said housing, each of said units including a heater pad, a heating element and a temperature sensor for measuring the temperature of the surrounding formation after heating thereof by said heater means;
   control means for providing radial expansion of said at least two units so as to bring the units into firm engagement with the walls of the borehole; and
   means for monitoring the heat supplied by said heater means and the temperatures measured by said temperature sensors.

2. A convective heat flow probe device as claimed in claim 1 wherein the outer peripheral surfaces of said heater pads are configured as segments of a cylinder and form a full cylinder when taken together.

3. A convective heat flow proe deice as claimed in claim 2 wherein a plurality of said temperature sensors are located on each pad so as to extend along the length and across the width thereof, said heating element being located in the pad beneath the temperature sensors.

4. A convective heat flow probe device as claimed in claim 1 wherein said control means comprises a control motor and an expansion mechanism controlled thereby.

5. A convective heat flow probe device as claimed in claim 4 wherein said expansion mechanism comprises a lead screw driven by said control motor, a support collar mounted on said lead screw for movement in response to rotation of said lead screw and at least one pivotable attachment arm connected between said support collar and an associated said unit, so as to be pivotable, in response to movement of said support collar, to an expanded position wherein said associated unit is expanded radially.

6. A convective heat flow probe device as claimed in claim 5 wherein a said support collar is mounted at each end of said units, said support collars being mounted on said lead screw so as to move toward each other in response to rotation of said lead screw to provide radial expansion of said units.

7. A convective heat flow probe device as claimed in claim 5 further comprising means for providing a seal between the probe and the walls of the borehole.

8. A convective heat flow probe device as claimed in claim 7 wherein said seal providing means comprises a resilient packer member and actuator means movable responive to rotation of said lead screw for compressing said packer member to provide radial expansion thereof.

9. A convective heat flow probe device as claimed in claim 7 wherein a said seal providing means is located at both ends of the temperature sensor units.

10. A convective heat flow probe device as claimed in claim 1 further comprising means for providing a seal between the probe and the walls of the borehole.

11. A convective heat flow probe device as claimed in claim 10 wherein said seal providing means comprises a resilient packer member and actuator means movable responsive to said control means for compressing said packer member to provide radial expansion thereof.

* * * * *